United States Patent

Nehl et al.

Patent Number: 5,251,729
Date of Patent: Oct. 12, 1993

[54] VEHICLE SUSPENSION DAMPER WITH RELATIVE VELOCITY SENSOR HAVING CONTROLLED FLUX PATH

[75] Inventors: Thomas W. Nehl; Jeri A. Betts, both of Shelby Township, Utica County; Larry S. Mihalko, Farmington Hills, all of Mich.

[73] Assignee: General Motors Corporation, Detroit, Mich.

[21] Appl. No.: 811,428

[22] Filed: Dec. 20, 1991

[51] Int. Cl.$^5$ .............................................. B60G 11/26
[52] U.S. Cl. .............................. 188/299; 188/322.12; 280/707
[58] Field of Search ..................... 280/707, 709, 688; 188/299, 267, 1.11, 266, 322.12, 322.19; 364/424.01

[56] References Cited

U.S. PATENT DOCUMENTS

| | | | |
|---|---|---|---|
| 4,674,768 | 6/1987 | Morra | 280/707 |
| 4,866,437 | 9/1989 | Morra | 340/870.36 |
| 4,909,536 | 3/1990 | Hale | 280/707 |
| 4,989,844 | 2/1991 | Wijnhoven et al. | 267/64.24 |
| 5,000,478 | 3/1991 | Kerastas | 280/707 |
| 5,004,264 | 4/1991 | Kozaki et al. | 280/707 |
| 5,009,450 | 4/1991 | Herberg et al. | 280/707 |
| 5,120,030 | 6/1992 | Lin et al. | 188/267 X |
| 5,135,251 | 8/1992 | Wörmann | 188/299 X |

Primary Examiner—Douglas C. Butler
Attorney, Agent, or Firm—Robert M. Sigler

[57] ABSTRACT

A relative velocity sensor in a vehicle suspension damper comprises an annular, radially polarized magnet at the top of the shock cylinder adjacent a sensor winding on the inside of the dust tube. A closed magnetic circuit is defined from the magnet through an annular magnetic member inside the magnet to the piston rod and back through the dust tube across the sensor winding to the magnet. Flux below the magnet is similarly confined through the cylinder and does not affect the sensor winding. The air gaps at the winding and the piston rod do not change with axial movement; and the flux linkage variation with axial movement is thus linear across the entire coil. A voltage is generated across the coil which is a strong and accurate signal of relative movement between the sprung and unsprung masses of the vehicle.

4 Claims, 1 Drawing Sheet

VEHICLE SUSPENSION DAMPER WITH RELATIVE VELOCITY SENSOR HAVING CONTROLLED FLUX PATH

BACKGROUND OF THE INVENTION

This invention relates to vehicle suspension dampers for use in controlled damping vehicle suspension systems. Such systems incorporate shock or strut devices capable of varying their damping characteristics in response to an electronic control signal. This signal is typically generated in an electronic control in response to one or more suspension related input signals. In a closed loop suspension control, an important input signal indicates the velocity of movement between the vehicle sprung mass, or body, and the vehicle unsprung mass, or wheel assembly.

The prior art includes publications describing systems in which the vehicle suspension at a wheel includes a suspension relative position sensor such as an LVDT. The position signal from such a sensor may be differentiated to provide a relative velocity signal; however, the process requires additional electronic circuitry with difficult design requirements.

The prior art also includes relative velocity sensors incorporated in suspension components such as dampers. For example, the patent to Herberg et al 5,009,450 discloses such a sensor incorporated in a vehicle shock absorber of the type having a cylinder attached to one of the sprung and unsprung masses and a piston in the cylinder attached through a rod extending out of the cylinder to the other of the sprung and unsprung masses. The rod further carries a dust tube which extends over a substantial portion of the cylinder. An axially polarized annular magnet is attached to but magnetically spaced from the top of the cylinder and is further magnetically spaced from the piston rod; and a sensor winding is distributed axially along the inside of the dust tube, which is made of a non-magnetic material. Vertical motion between the sprung and unsprung masses causes similar axial motion between the dust tube and cylinder and moves the magnet axially along the sensor winding.

However, the Herberg et al sensor provides a low output through the middle of its range and loses its linearity near the ends of its range. The variation of flux linkage with position is very flat and actually reverses direction near one end. In addition, with its uncontrolled flux paths, it is highly susceptible to the presence of nearby magnetic objects, such as other suspension members, which may distort the flux paths. Thus, the output voltage is low and is not a dependably accurate indication of the relative velocity of the sprung and unsprung masses of the vehicle.

SUMMARY OF THE INVENTION

It is an object of this invention to provide a relative velocity sensor in a vehicle suspension damper of the type in which a magnet is moved axially across a sensor winding, the sensor exhibiting a linear variation of flux linkage with magnet movement across substantially the entire travel thereof for an accurate relative velocity output voltage signal. This is accomplished by confining most of the flux from the magnet in a structural arrangement providing a closed magnetic flux path with no significant flux variation as the magnet and sensor winding move axially relative to each other. Thus, the variation in the number of turns enclosed by the flux path, which is linear, produces a linear flux linkage variation.

In particular, the dust tube on which the sensor winding is mounted is made of a magnetic material, the magnet is radially polarized, and magnetic means are provided to form, with the dust tube, a closed magnetic flux path for the magnet with substantially constant air gaps. The magnet may be annular; and the closed magnetic flux path may include the piston rod and an annular magnetic member inside the magnet. The annular magnetic member forms an air gap with the piston rod which does not vary with relative axial movement; and the magnet forms an air gap with the dust tube which likewise does not vary with relative axial movement. Thus, relative axial movement varies only the number of turns enclosed by the flux path; and this provides a linear flux linkage variation for an accurate relative velocity signal.

DESCRIPTION OF THE PREFERRED EMBODIMENT

Figure 1:
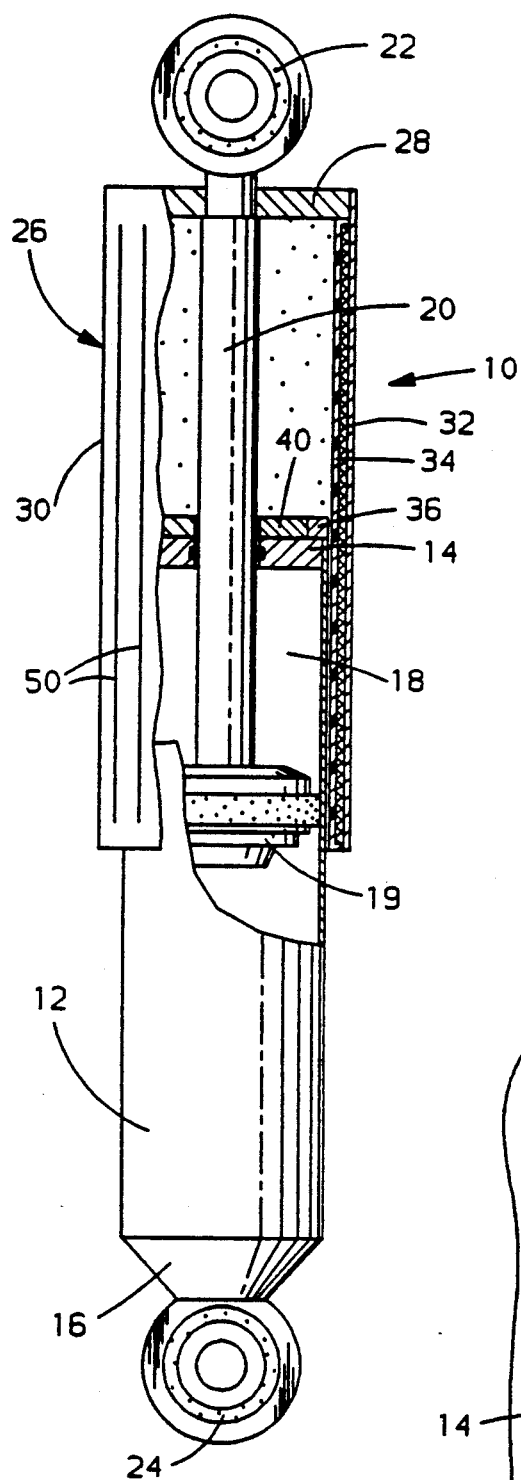
FIG. 1 is a partially cutaway view of a damper with a sensor according to this invention.

Referring to FIG. 1, a vehicle damper comprises a shock absorber 10. Shock absorber 10 comprises a cylinder 12 having a non-magnetic upper rod guide 14 and is closed at the lower end 16 to define a cylindrical cavity 18. Cylindrical cavity 18 is divided into upper and lower chambers by a piston 19 which is sealingly disposed for axial movement therein. The axial movement of piston 19 pumps fluid between the chambers in cylindrical cavity 18 and a reservoir, not shown, with orifices and valves providing damping in the manner normal for shock absorbers. Since the sensor of this invention would normally be used with dampers having variable damping, one or more of the valves or orifices may be controllable in response to a control signal. The precise structure and operation of the damper itself, including damping control, is unimportant to the disclosure of this invention; and the prior art shows many known constructions which may be modified according to this disclosure.

Piston 19 is attached to the lower end of a reciprocating piston rod 20, which extends upward through an opening in rod guide 14 and is sealed thereto by a standard sliding seal arrangement, shown symbolically in the Figures, which retains the fluid in cylindrical chamber 18. Rod 20 extends upward in the Figure out of cylinder 12 and ends in a standard fitting 22 for attachment to the sprung mass or body of a motor vehicle at one corner thereof. A similar fitting 24 attached to lower end 16 of cylinder 12 provides attachment to a member of the unsprung mass or wheel assembly of the vehicle such as a control arm thereof. A dust tube 26 comprises a radial disk portion 28 attached to rod 20 at the end thereof adjacent fitting 22 and a cylindrical portion 30 projecting downward from disk portion 28 around a substantial length of cylinder 12. Dust tube 26 is normally provided to prevent dirt from entering and harming the seals in cylinder 12 around rod 20. Relative movement of the sprung and unsprung masses o the vehicle produces relative axial movement between cylinder 12, which is attached to and moves with the unsprung mass, and the assembly of rod 20, dust tube 26 and the piston, which is attached to and moves with the sprung mass of the vehicle. Cylinder 12, piston rod 20, and dust tube 26 are all made of a magnetic material such as steel.

Figure 2:
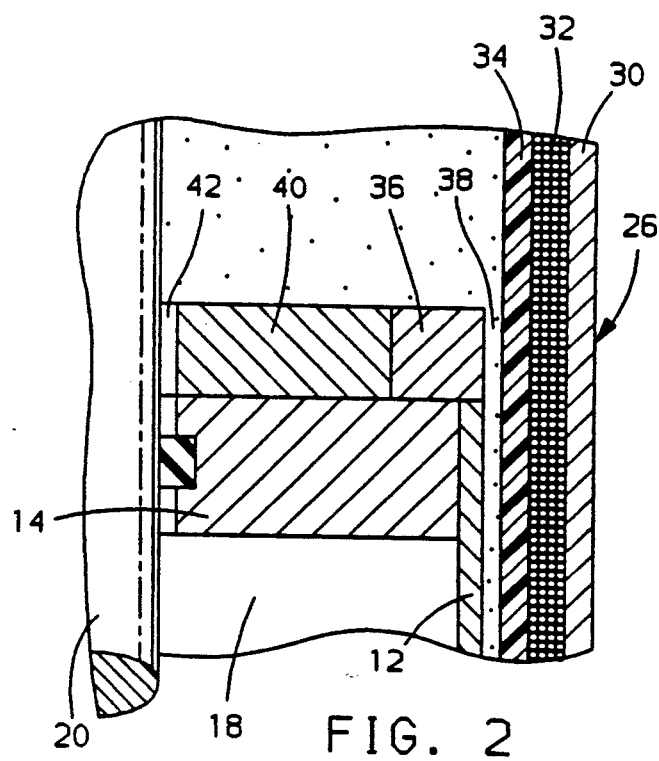
FIG. 2 is an enlarged view of a portion of FIG. 1 showing greater detail.

A sensor winding 32 is wound on a non-magnetic bobbin 34 which is press fit into the inside of the cylindrical portion 30 of dust tube 26, extending over a substantial axial length thereof: for example, 110 millimeters. Sensor winding 32 is shown in FIG. 2 as comprising multiple layers of wound Wire. An embodiment which has been built and tested on a vehicle comprises four layers of standard varnish coated 33 gauge wire, the wire wound in even layers in a linear manner over the full length of the winding; however, the precise number and length of layers, gauge of wire, etc. will depend on the particular application. The ends of sensor winding 32 are connected to terminals in a connector, not shown, for communication of the voltage generated in sensor winding 32 as an output signal. No special winding arrangements or extra coils are required for accurate sensor output or end of coil sensing.

An annular magnet 36 is attached to the top of cylinder 12. It is polarized radially, so that one of its poles (north) is on the outer circumference and the lines of flux are directed radially outward across a small gap 38, through bobbin 34 and sensor winding 32 to the cylindrical portion 30 of dust tube 26. Magnet 36 in the unit built and tested is made of Magnequench MQ1 (R) material, although other magnetic materials may be used if desired. An annular magnetic flux member 40, which may be made of steel, is provided adjacent the other (south) magnetic pole at the inner annular surface of magnet 36; and member 40 provides a flux path for the flux lines from the other pole of magnet 36 to piston rod 20 across a small gap 42. The closed magnetic circuit may be traced from magnet 36, through flux member 40, across air gap 42, up piston rod 20, out disk 28 of dust tube 26, down cylindrical portion 30 of dust tube 26 and across the air gap comprising sensor winding 32, bobbin 34 and gap 38 to magnet 36. Although this magnetic circuit includes the two air gaps described above, these air gaps will remain essentially constant in length as cylinder 12 moves axially relative to piston rod 20 and dust tube 26 and will thus not materially affect the flux through sensor winding 32 with such movement.

Some additional magnetic flux from magnet 36 will tend to follow a path downward through the cylindrical outer wall of cylinder 12, the upper end of which ends adjacent magnet 36. However, this flux will also be confined to a well defined flux path within cylinder 12 that is invariable with the axial movement of cylinder 12 relative to piston rod 20 and dust tube 26, so that it will not affect the flux path through sensor winding 32. As long as magnet 36 is not totally shorted through cylinder 12, the MQ1 magnet will produce sufficient flux for both flux paths from a small magnet. A small air gap may be provided axially between magnet 36 and the outer wall of cylinder 12 to prevent such magnetic shorting if the magnetic circuit through cylinder 12 has insufficient additional air gap length. However, too great an air gap may degrade sensor output and linearity through insufficient control of the flux below the magnet. The air gap required, if any, is a matter for ordinary design skill in a particular case.

The flux through sensor winding 32 will not vary significantly with relative axial movement between cylinder 12 and dust tube 26. Therefore, the only variable with such movement will be the number of turns of the sensor winding enclosed by the flux path, between the magnet and the top of the sensor winding. Since the sensor winding is wound in a linear manner, the variation of turns with axial movement of the magnet 36, and thus the flux linkage, will vary in a linear manner. A voltage will thus be generated in sensor winding 32 proportional to the rate of change of flux linkage, which will accurately indicate the relative velocity of the sprung and unsprung masses of the vehicle. Tests of the unit described above have produced a 1.8 volt output at 1 meter/second relative velocity.

Cylindrical portion 30 of dust tube 26 is preferably provided with one or more axial slits 50, as seen in FIG. 1. Each of slits 50 may be about 1 mm in width and should preferably extend in length at least to the axail ends of sensor winding 32. Slits 50 interrupt eddy currents induced by the moving magnet in dust tube 26 and thereby reduce phase lag in the output voltage at high frequencies. A greater number of slits will provide a greater reduction in eddy currents; but a very large number of slits may adversely affect the sensor output or the protective function of the dust tube. The embodiment tested included 8 slits evenly spaced around the outer surface of cylindrical portion 30 of dust tube 26; but the optimum number may be different and may vary with the requirements of particular applications. Slits 50 may be filled with a non-magnetic material if there is any chance of dust, stones, etc. getting through slits 50 and damaging sensor winding 32 or getting further past sensor winding 32 and bobbin 34 into the interior of the damper.

We claim:

1. In a vehicle suspension damper comprising (a) a cylindrical body made of a magnetic material and having a closed end attached to one of a vehicle sprung mass and unsprung mass for vertical movement therewith and an opposite end, (b) a piston axially movable in the cylindrical body and fixed to a rod made of a magnetic material and projecting axially from the opposite end of the cylindrical body and attached to the other of the vehicle sprung mass and unsprung mass for vertical movement therewith, and (c) a cylindrical dust tube having a closed end attached to the rod adjacent the other of the vehicle sprung mass and unsprung mass for axial movement therewith and further having an opposite open end, the dust tube surrounding and being radially spaced from a portion of the cylindrical body including the opposite end thereof, apparatus for sensing relative velocity of movement between the vehicle sprung and unsprung masses, the apparatus comprising:

an annular member closing the opposite end of the cylindrical body except for an opening through which the rod extends, the annular member comprising a magnetic portion extending radially across the annular member to form a first air gap with the rod at a radially inner end of the magnetic portion and a second air gap with the dust tube at a radially outer end of the magnetic portion, the magnetic portion comprising a radially polarized permanent magnet and both the first air gap and second air gap being substantially invariant with relative vertical movement between the sprung and unsprung masses;

a sensor winding extending axially over a substantial length of an inner side of the dust tube through the second air gap; and the dust tube being made of a magnetic material to form, with the rod and magnetic portion of the annular member, a closed magnetic circuit for the permanent magnet through an adjacent portion of the sensor winding, whereby uncontrolled stray magnetic flux is eliminated and a flux linkage of the sensor winding enclosed by the closed magnetic circuit exhibits a linear variation with relative vertical movement between the vehicle sprung and unsprung masses to generate a voltage accurately representing the velocity of said movement.

2. The damper of claim 1 in which the cylindrical body comprises another closed magnetic circuit which is substantially invariable with relative axial movement of the cylindrical body and which does not intersect the sensor winding.

3. The damper of claim 1 in which the dust tube is made of an electrically conducting material and is provided with at least one axial slit for reduction of eddy currents induced therein by relative movement of the magnet.

4. The damper of claim 1 in which the radially polarized permanent magnet comprises the radially outer end of the magnetic portion and the magnetic portion further comprises an annular magnetic member engaging an inner annular surface of the radially polarized permanent magnet and extending radially inward to the radially inner end of the magnetic portion.

* * * * *